United States Patent
Wang et al.

(10) Patent No.: US 7,249,350 B2
(45) Date of Patent: Jul. 24, 2007

(54) OPTIMIZED TRANSLATION OF SCALAR TYPE SIMD INSTRUCTIONS INTO NON-SCALAR SIMD INSTRUCTIONS

(75) Inventors: Yun Wang, Shanghai (CN); Orna Etzion, Haifa (IL)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 10/259,843

(22) Filed: Sep. 30, 2002

(65) Prior Publication Data

US 2004/0064810 A1   Apr. 1, 2004

(51) Int. Cl.
*G06F 9/45* (2006.01)
*G06F 15/00* (2006.01)

(52) U.S. Cl. ............. 717/136; 717/149; 717/151; 712/22

(58) Field of Classification Search ............ 717/136, 717/149, 151; 712/22
See application file for complete search history.

(56) References Cited

U.S. PATENT DOCUMENTS

| | | | |
|---|---|---|---|
| 6,230,253 B1 * | 5/2001 | Roussel et al. | 712/22 |
| 2002/0010847 A1 * | 1/2002 | Abdallah et al. | 712/22 |
| 2003/0140335 A1 | 7/2003 | Li et al. | |
| 2003/0221089 A1 * | 11/2003 | Spracklen | 712/221 |

* cited by examiner

*Primary Examiner*—Tuan Dam
*Assistant Examiner*—John Romano
(74) *Attorney, Agent, or Firm*—Michael R. Barre

(57) ABSTRACT

An arrangement is provided for translating a plurality of scalar single instruction multiple data stream (SIMD) instructions into a plurality of optimized non-scalar SIMD instructions to be executed on a target architecture supporting only parallel SIMID instructions. After receiving a plurality of scalar SIiVLD instructions, translation from the scalar SIMD instructions to non-scalar SIMD instructions is performed. The translation is optimized so that the number of translated non-scalar SIMD instructions is minimized. The translated non-scalar SIIViD instructions are executed on a target architecture that supports only parallel SIMD instructions.

26 Claims, 13 Drawing Sheets

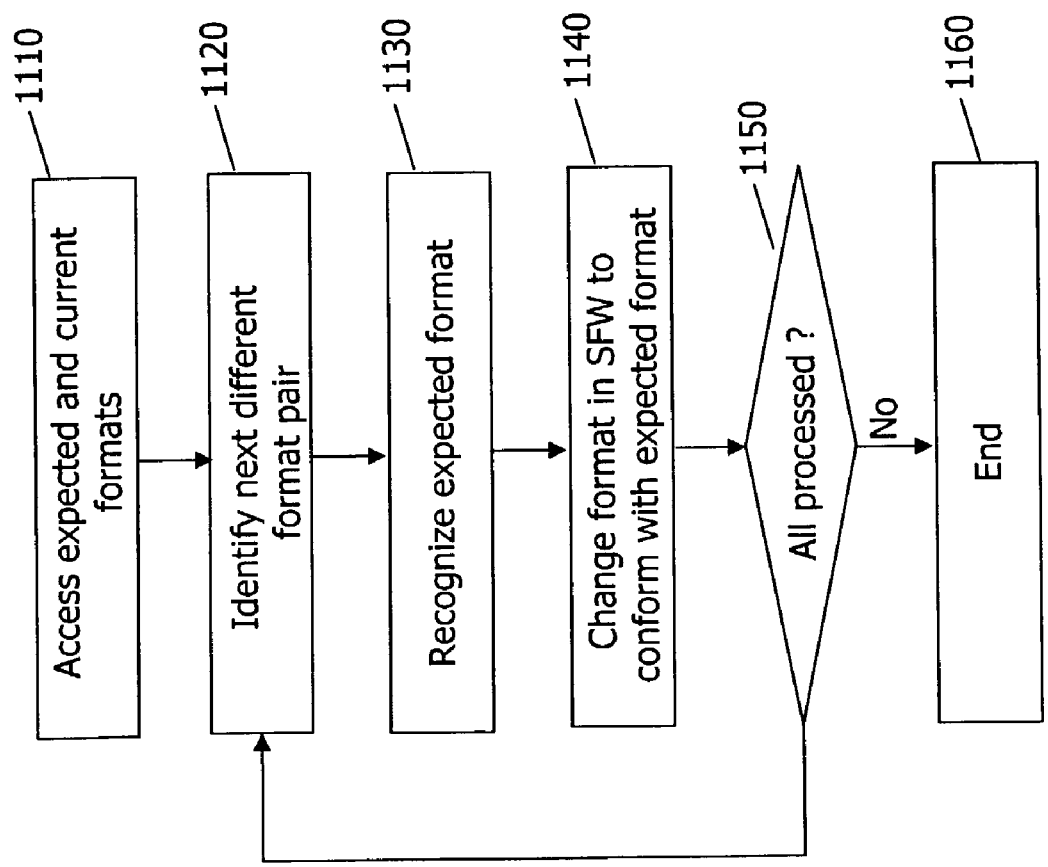

OPTIMIZED TRANSLATION OF SCALAR TYPE SIMD INSTRUCTIONS INTO NON-SCALAR SIMD INSTRUCTIONS

BACKGROUND

A single instruction multiple data stream (SIMD) instruction enables a computer that supports parallel processing to base on a single instruction such as an add instruction to perform a single operation on more than one data stream in parallel. Such an SIMD instruction can be used for speeding up processing and utilizing registers with adequate number of bytes in an efficient manner. A scalar type SIMD instruction is different from a parallel (non-scalar) SIMD instruction in that the operation specified in a scalar SIMD instruction is carried out on only one of the multiple data elements while the operation specified by a parallel SIMD instruction is carried out on all of the multiple data elements. This difference is illustrated in FIGS. 1(a) and 1(b).

A parallel SIMD instruction operates simultaneously on all data elements. FIG. 1(a) (Prior art) shows how different data elements in two parallel registers are added in parallel via a parallel SIMD instruction "ADD PS Xmm1, Xmm2", where "ADD PS" indicates that it is a parallel scalar (PS) add (ADD) instruction and that registers Xmm1 and Xmm2 store the multiple data elements (operands) that are to be added in parallel. In this example, each register has 128 bits, corresponding to four data elements, each of which has 32 bits. The data elements in register Xmm1 have floating point values of 3.5, 12.8, 0.32, and 1.0, respectively. The data elements in register Xmm2 have floating point values of 4.3, 7.1, 2.65, and 4.0, respectively. When the parallel SIMD instruction "ADD PS Xmm1, Xmm2" is performed, the values in corresponding data elements of the two registers are added simultaneously, yielding values of 7.8, 19.0, 2.97, and 5.0, respectively. The addition result is stored in the destination register Xmm1 (which is also a source register).

A scalar SIMD instruction performs computation on only one data element stored in each of the operand parallel registers, as illustrated in FIG. 1(b) (Prior art). An example scalar SIMD instruction "ADD SS Xmm1, Xmm2" performs an addition operation on single data elements stored at the lowest 32 bits of the two operand registers (i.e., Xmm1 and Xmm2). In the illustrated example, only data 1.0 and 4.0 (that occupy the lowest 32 bits of Xmm1 and Xmm2) are added, yielding 5.0 to be stored at the lowest 32 bits of the destination register (Xmm1). During this operation, the upper bits (i.e., bits 33-127) of the registers should remain unchanged. That is, the execution of the "ADD SS" instruction needs to ensure the integrity of all the upper bits of the registers.

To ensure the integrity of the upper 96 bits, conventional solutions extract the single data elements from involved registers (e.g., extract 1.0 and 4.0 from the lower 32 bits of the registers) from parallel registers, place extracted data elements elsewhere to perform the computation, and then merge the result (e.g., 5.0) into the intended destination parallel register (e.g., Xmm1). This involves four separate steps of operations, namely two extraction operations to extract the source data elements (e.g., 1.0 and 4.0), one computation operation (e.g., ADD SS), and a merging operation to merge the result (e.g., 5.0) back to the destination parallel register (e.g., Xmm1).

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

FIG. 11 is a flowchart of an exemplary process, in which register formats on an architecture on which an intra-block of non-scalar SIMD instructions are executed are converted to match expected register formats determined according to the non-scalar SIMD instructions contained in an intra-block.

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1A:
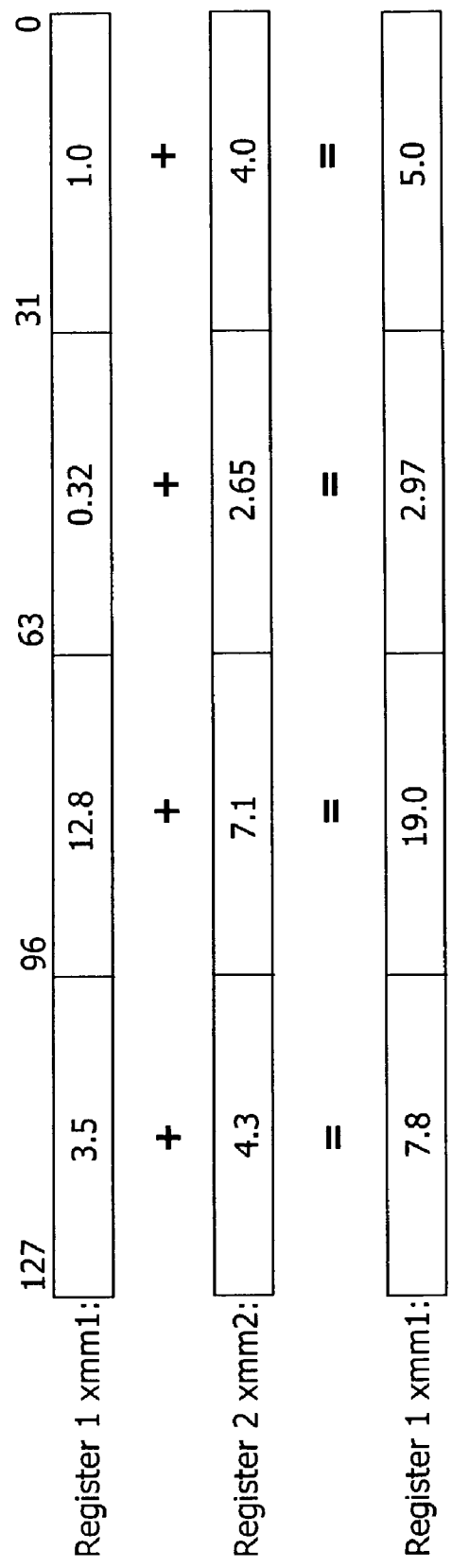
FIG. 1 describes the characteristics of carrying out scalar operations on an architecture that supports only parallel single instruction multiple data stream (SIMD) instructions.
Figure 1B:
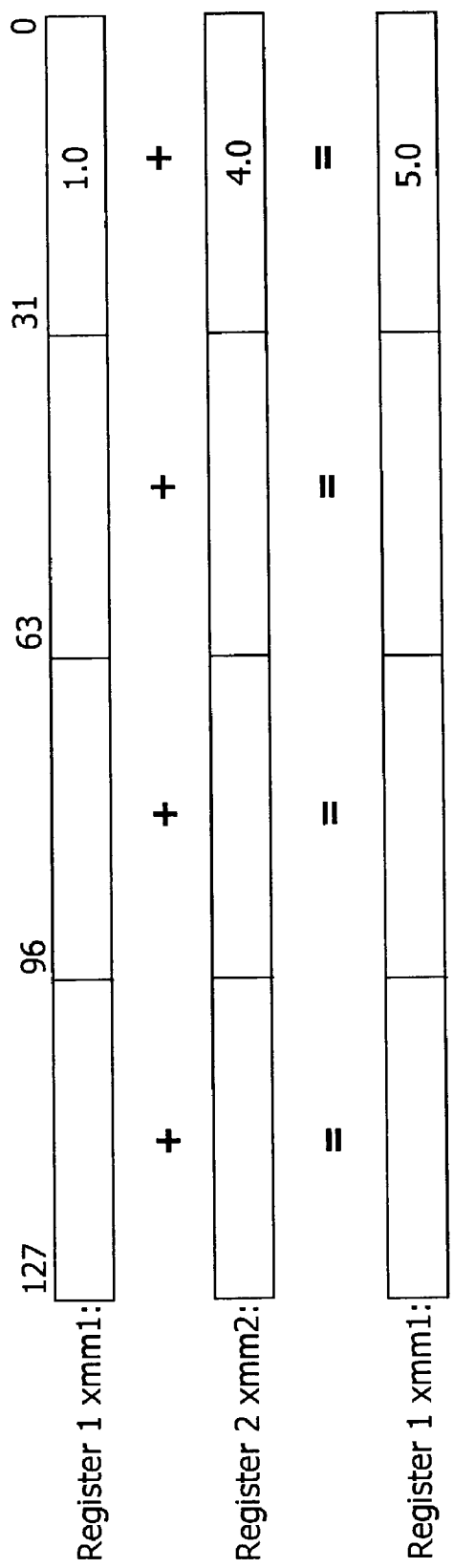
Figure 2:
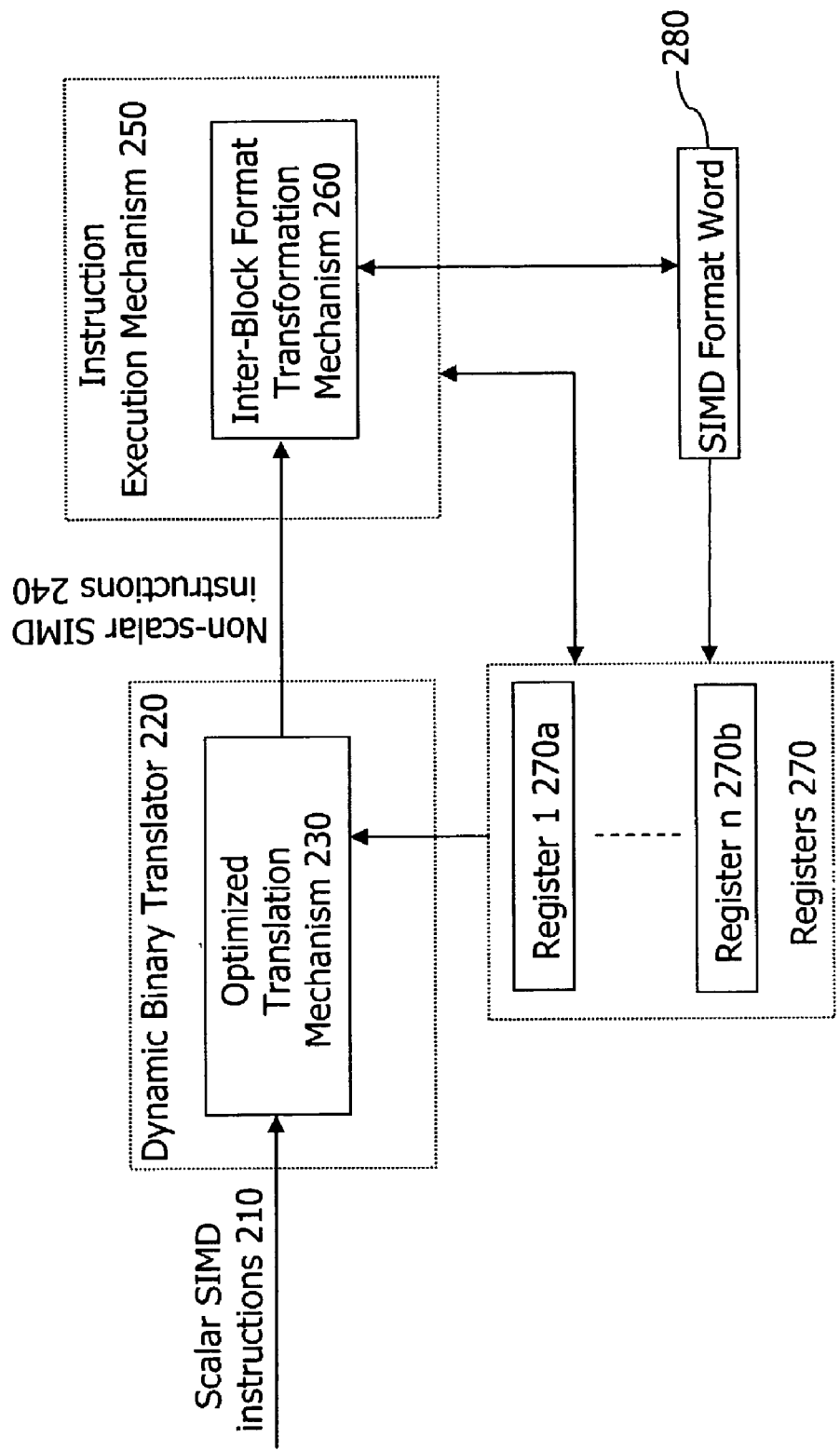
FIG. 2 depicts a framework for translating scalar SIMD instructions into optimized non-scalar SIMD instructions and for executing the optimized non-scalar SIMD instructions on an architecture supporting only parallel SIMD instructions.

FIG. 2 depicts a framework 200 for translating scalar SIMD instructions 210 into optimized non-scalar SIMD instructions 240 and for executing the optimized non-scalar SIMD instructions on an architecture supporting only parallel SIMD instructions. The framework 200 comprises a dynamic binary translator 220 and an instruction execution mechanism 250. The dynamic binary translator 220 takes a plurality of scalar SIMD instructions 210 as input and generates the non-scalar SIMD instructions 240 via its optimized translation mechanism 230. The instruction execution mechanism 250 executes the non-scalar SIMD instructions 240 on a target device (not shown in FIG. 2) with an architecture that supports only parallel SIMD instructions. The target device can be a computer, a laptop, a hand held device such as a personal data assistant (PDA), or a wireless phone. When the target device is a computer, it can be a general purpose computer, a special purpose computer, or a personal computer.

The dynamic binary translator 220 may be physically located on a target device that supports only parallel SIMI instructions. It may also be deployed on a device other than the target device but connected to the target device to perform translations. The dynamic binary translator 220 may be activated to provide real-time translation when the target device receives scalar SIMD instructions 210 and subsequently invokes the optimized translation mechanism 230 to generate the optimized non-scalar SIMD instructions 240. The non-scalar SIMD instructions 240 may comprise a plurality of instructions which may be organized into multiple intra-blocks. Each of the intra-blocks may include one or more non-scalar SIMD instructions that may be translated from one or more input scalar SIMD instructions that have certain data dependency.

The optimized translation mechanism 230 may utilize data dependency among scalar SIMD instructions to minimize the number of translated non-scalar SIMD instructions. For instance, in the following scalar SIMD instructions:

ADDSS Xmm1, Xmm2
ADDSS Xmm1, Xmm3
ADDSS Xmm1, Xmm4
ADDSS Xmm1, Xmm5 where "ADDSS" is an "add scalar" instruction, "Xmm?" refers to register? (e.g., Xmm1 refers to register 1, Xmm2 refers to register 2, etc.), there are data dependencies among all four instructions. Conventional binary translation approaches generate four non-scalar instructions for each scalar instruction. For instance, for the first scalar instruction illustrated above, a convention translation approach will generate the following non-scalar SIMD instructions:

FEXTRACT_PARALLEL_TO_SCALAR f_scr1, Xmm1
FEXTRACT_PARALLEL_TO_SCALAR f_scr2, Xmm2
FADD_SCALAR f_scr1, f_scr2
FMERGE_SCALAR_INTO_PARALLEL Xmm1, f_scr1 where "FEXTRACT_PARALLEL_TO_SCALAR" is an extraction instruction that extracts data from a parallel register (e.g., Xmm1) to a scalar register (e.g., f_scr1), "FADD" is a "floating add" instruction which adds a source operand and a destination operand (e.g., f_scr1 and f_scr2) and places the result in the destination register (e.g., f_scr1), and "FMERGE_SCALAR-INTO_PARALLEL" is a "merging" instruction that merges a scalar (e.g., f_scr1) into a parallel register (e.g., Xmm1). For all four scalar SIMD instructions illustrated above, a convention translation approach will generate a total of at least 16 non-scalar SIMD instructions.

In the above illustrated block of scalar SIMD instructions, data dependency exists. The result of each add operation is placed in a destination register (i.e., Xmm1) and the subsequent add instructions not only use the result from a previous add operation but also place the result in the same register (i.e., register Xmm1). With this data dependency, there is no need to merge the result of the first add operation back to a parallel register and consequently there is no need to extract such merged result from a parallel register for the second add operation. Utilizing such data dependency, the optimized translation mechanism 230 may generate the following set of non-scalar SIMD instructions:

FEXTRACT_PARALLEL_TO_SCALAR Xmm1.scalar, Xmm1
FEXTRACT_PARALLEL_TO_SCALAR Xmm2.scalar, Xmm2
FADD_SCALAR Xmm1.scalar, Xmm2.scalar
FEXTRACT_PARALLEL_TO_SCALAR Xmm3.scalar, Xmm3
FADD_SCALAR Xmm1.scalar, Xmm3.scalar
FEXTRACT_PARALLEL_TO_SCALAR Xmm4.scalar, Xmm4
FADD_SCALAR Xmm1.scalar, Xmm4.scalar
FEXTRACT_PARALLEL_TO_SCALAR Xmm5.scalar, Xmm5
FADD_SCALAR Xmm1.scalar, Xmm5.scalar
FMERGE_SCALAR_INTO_PARALLEL Xmm1, Xmm1.scalar where "Xmm1.scalar" represent a register used as a scalar register corresponding to Xmm1. The subject of dynamically designating a register as a particular form will be discussed later. In the above illustration, the content of Xmm1 is first extracted from a parallel register to a designated scalar register (Xmm1.scalar) once and the subsequent add operations place the results continuously in Xmm1 scalar until the end of all four add operations. The four original scalar SIMD instructions may correspond to an intra-block if instructions prior and after these four instructions do not have any data dependency with the block. One or more instructions prior to these four scalar SIMD instructions may form a different intra-block within which some data dependency exists. Similarly, one or more scalar SIMD instructions after these four may also be grouped into an intra-block based on some data dependency within the block. The relationship between two intra-blocks is called inter-block relationship. Such relationship may be useful in determining how to make the execution of each intra-block more efficient. This will be discussed later in reference to FIGS. 5, 10, and 11.

The output of the dynamic binary translator 220, i.e., the non-scalar SIMD instructions 240, may be executed on the target device having an architecture that supports only parallel SIMD instructions. The non-scalar SIMD instructions 240 may comprise multiple intra-blocks, each of which includes a plurality of non-scalar SIMD instructions. A plurality of registers 270 within the target architecture may be used by the non-scalar SIMD instructions 240 as either parallel registers or dedicated scalar registers, depending on what each of the intra-block of non-scalar SIMD instructions 240 requires. The instruction execution mechanism 250 executes the non-scalar SIMD instructions 240 on the target device. The instruction execution mechanism 250 may be physically located within the target device; it may also be located outside of the target device or even at a different physical location than the target device but connected with the target device.

The instruction execution mechanism 250 includes an inter-block format transformation mechanism 260 that ensures that, for each intra-block of the non-scalar SIMD instructions 240, the format of the registers 270 in the target architecture are consistently designated according to what is required by the intra-block. For example, a register on the target device may be a parallel register, but it can be designated as a dedicated scalar floating point register. That is, a register can be dynamically designated for different uses according to needs arising from executing an intra-block of non-scalar SIMD instructions.

The inter-block format transformation mechanism may utilize an SIMD format word 280 for the purpose of designating associated registers of the target device. The SIMD format word 280 may have a plurality of elements, each of which may correspond to one of the registers 270. For example, the designated format of a register 1 270*a* may be recorded in the first element of the SIMD format word, . . . , the designated format of a register n 270*b* may be recorded in the nth element of the SIMD format word 280. The SIMD format word 280 represents the current designations of the registers 270. With the SIMD format word 280, when an intra-block of non-scalar SIMD instructions requires different register designations, to comply with the new required designations, by the inter-block format transformation mechanism 260 may simply change the SIMD format word 280.

When the designated formats of the registers 270 specified in the SIMD format word 280 are consistent with what an intra-block requires, the instruction execution mechanism 250 executes the non-scalar SIMD instructions in the intra-block on the target device and uses the registers 270 as if they are in their designated formats. Below, detailed descriptions related to different parts of the framework 200 are presented.

Figure 3:
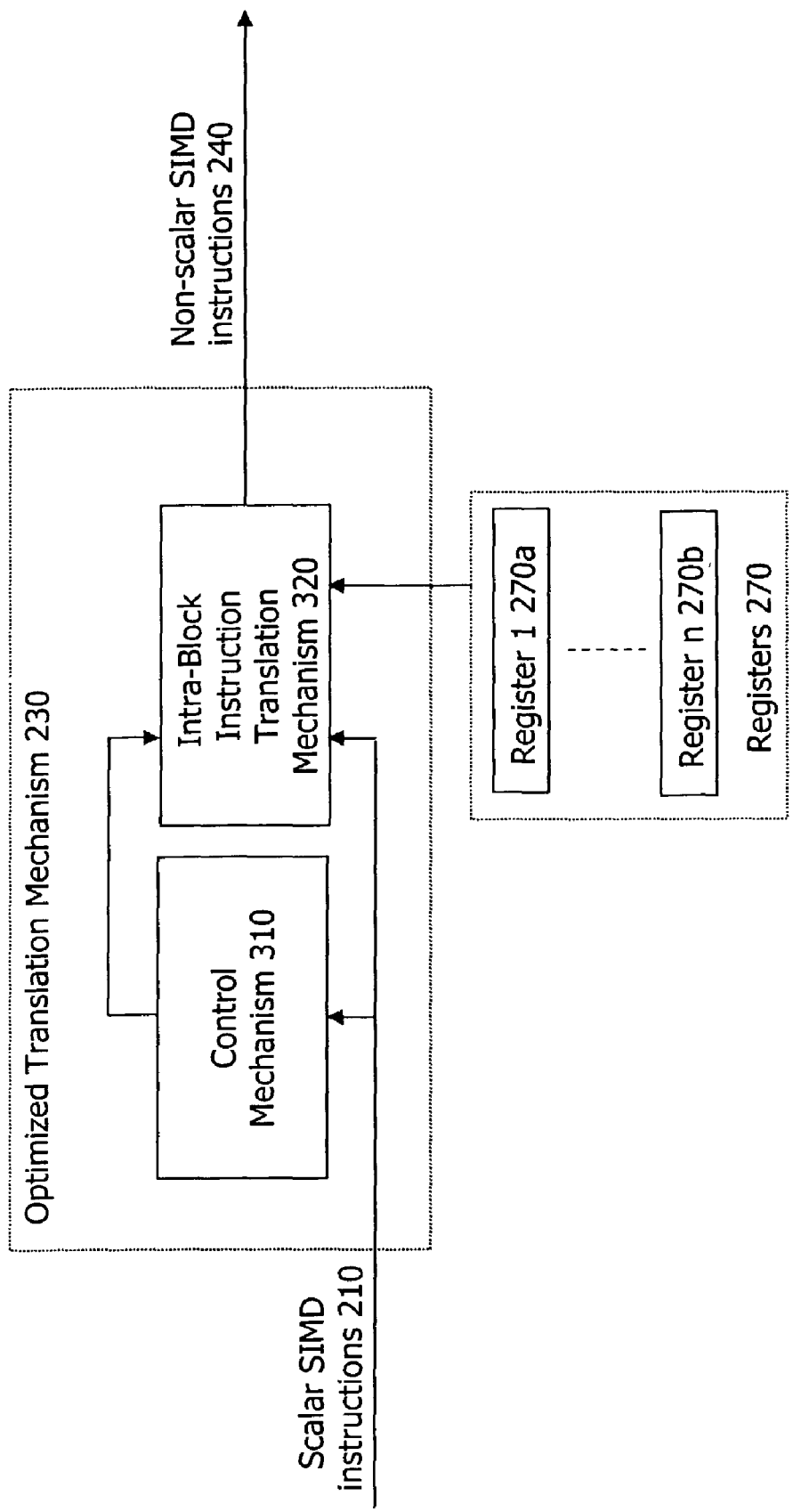
FIG. 3 depicts an exemplary internal structure of an optimized translation mechanism.

FIG. 3 depicts an exemplary internal structure of the optimized translation mechanism 230. The optimized translation mechanism 230 comprises a control mechanism 310 and an intra-block instruction translation mechanism 320. Based on the input scalar SIMD instructions 210, the control mechanism 310 controls the process of generating the optimized non-scalar SIMD instructions 240. For instance, it may analyze the data dependencies among the input scalar SIMD instructions 210 and identify the boundaries of various intra-blocks. For each of such identified intra-blocks, the control mechanism 310 may then activate the intra-block instruction translation mechanism 320 to produce optimized non-scalar SIMD instructions corresponding to the intra-block by utilizing the existing data dependencies. The boundary between the non-scalar SIMD instructions translated based on one intra-block and the non-scalar SIMD instructions translated based on an adjacent intra-block may be marked. Such boundary may be marked in the form of check points and may be used in directing individual handling of different intra-blocks during execution (discussed later with reference to FIGS. 5, 10, and 11). It is also understood to those skill in the art that any other means to signify such intra-block boundary can also be applied.

Figure 4:
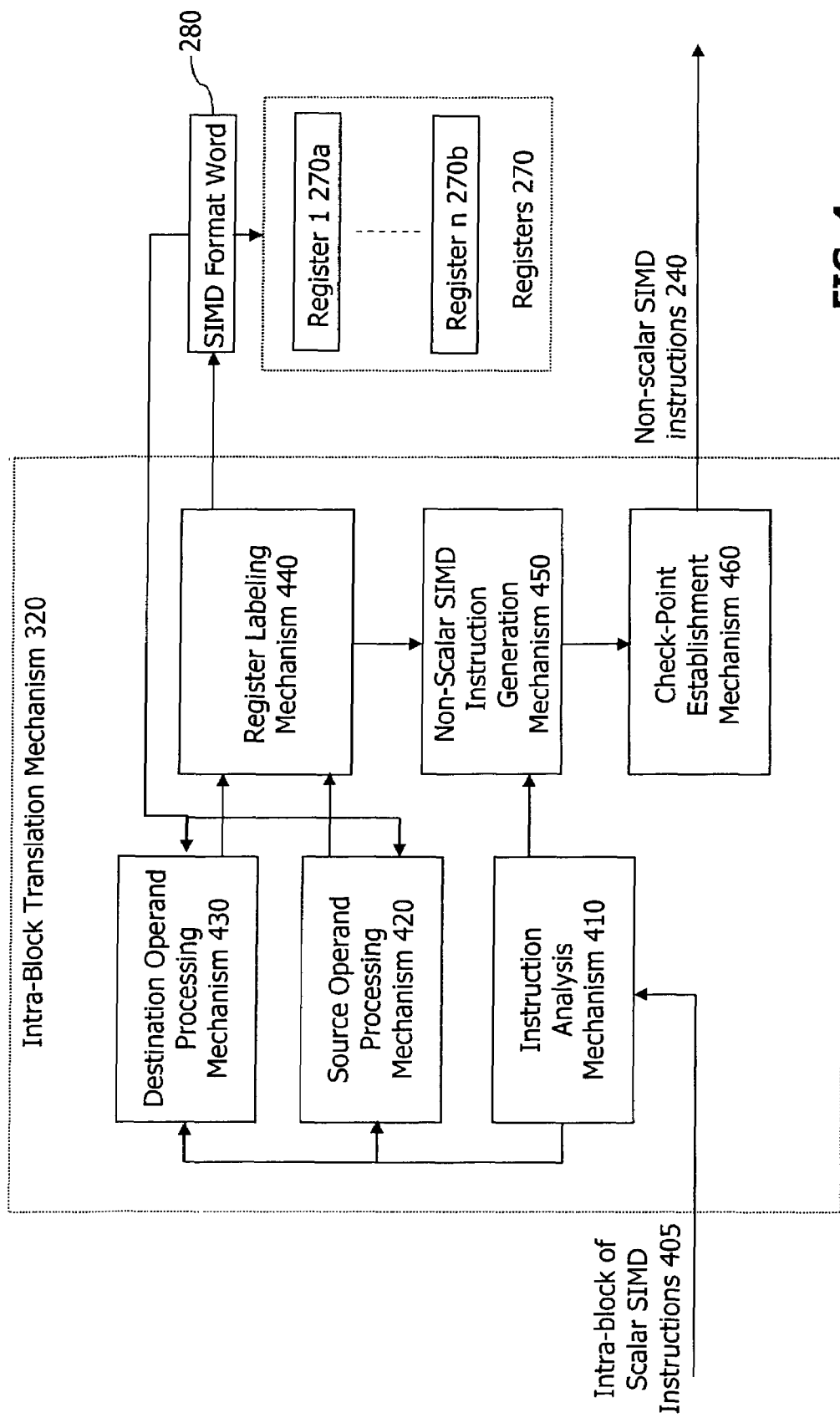
FIG. 4 depicts an exemplary internal structure of an intra-block translation mechanism.

FIG. 4 depicts an exemplary internal structure of the intra-block translation mechanism 320. To achieve the above described functionalities, the intra-block translation mechanism 320 includes, but is not limited to, an instruction analysis mechanism 410, a source operand processing mechanism 420, a destination operand processing mechanism 430, and a non-scalar SIMD instruction generation mechanism 450. The instruction analysis mechanism 410 takes an intra-block of scalar SIMD instructions 405 as input and analyzes each of the scalar SIMD instructions contained within the intra-block. The analysis results may be used to control generating corresponding non-scalar SIMD instructions. For example, if a scalar SIMD instruction is a scalar "add" instruction, the instruction analysis mechanism 410 may instruct the non-scalar SIMD instruction generation mechanism 450 to issue a corresponding "add" instruction.

Each scalar SIMD instruction has different operands, including one or more source operands and a destination operand. How such a scalar SIMD instruction should be translated into a non-scalar SIMD instruction may depend on the characteristics of both the source and destination operands. For instance, if a source operand is in a parallel register but will be read as a scalar, an extraction instruction needs to be generated that moves the source operand from the parallel register to, for instance, a dedicated scalar floating point register. The source operand processing mechanism 420 analyzes the characteristics of each of the source operands involved in a scalar SIMD instruction and accordingly instructs the non-scalar SIMD instruction generation mechanism 450 in terms of what non-scalar SIMD instruction(s) is (are) to be generated. Similarly, the destination operand processing mechanism 430 analyzes the characteristics of the destination operand of a scalar SIMD instruction and accordingly instructs the non-scalar SIMD instruction generation mechanism 450 as to what non-scalar SIMD instructions to be generated. For example, if a destination operand of the last scalar SIMD instruction in an intra-block is in a parallel register, the destination operand processing mechanism 430 may instruct the non-scalar SIMD instruction generation mechanism 450 to generate a merging instruction to merge from scalar to parallel or simply re-label the dedicated scalar register as a parallel register.

The intra-block translation mechanism 320 may also optionally include a register labeling mechanism 440 so that registers on a target architecture may be labeled for different designations. For instance, a parallel register in the registers 270 may be labeled as a dedicated scalar floating point register when it is to be used to store a source operand for scalar computation. Such labeling may be accomplished through the SIMD format word 280. That is, the formats of the registers 270 may be specified via the SIMD format word 280.

The intra-block translation mechanism 320 may also optionally include a check point establishment mechanism 460 that sets up check points in each intra-block to mark the boundary between adjacent intra-blocks. Such check points may be later used during execution so that different intra-blocks of non-scalar SIMD instructions (which may have inclusive data dependencies) can be handled differently during execution. For example, different data dependencies within each intra-block may yield different designations of registers. In this case, handling individual intra-blocks separately may become a necessity. The check point establishment mechanism 460 may also determine expected register formats involved in each intra-block which maybe used during execution to determine how to configure the register format needed by a particular intra-block.

Figure 5:
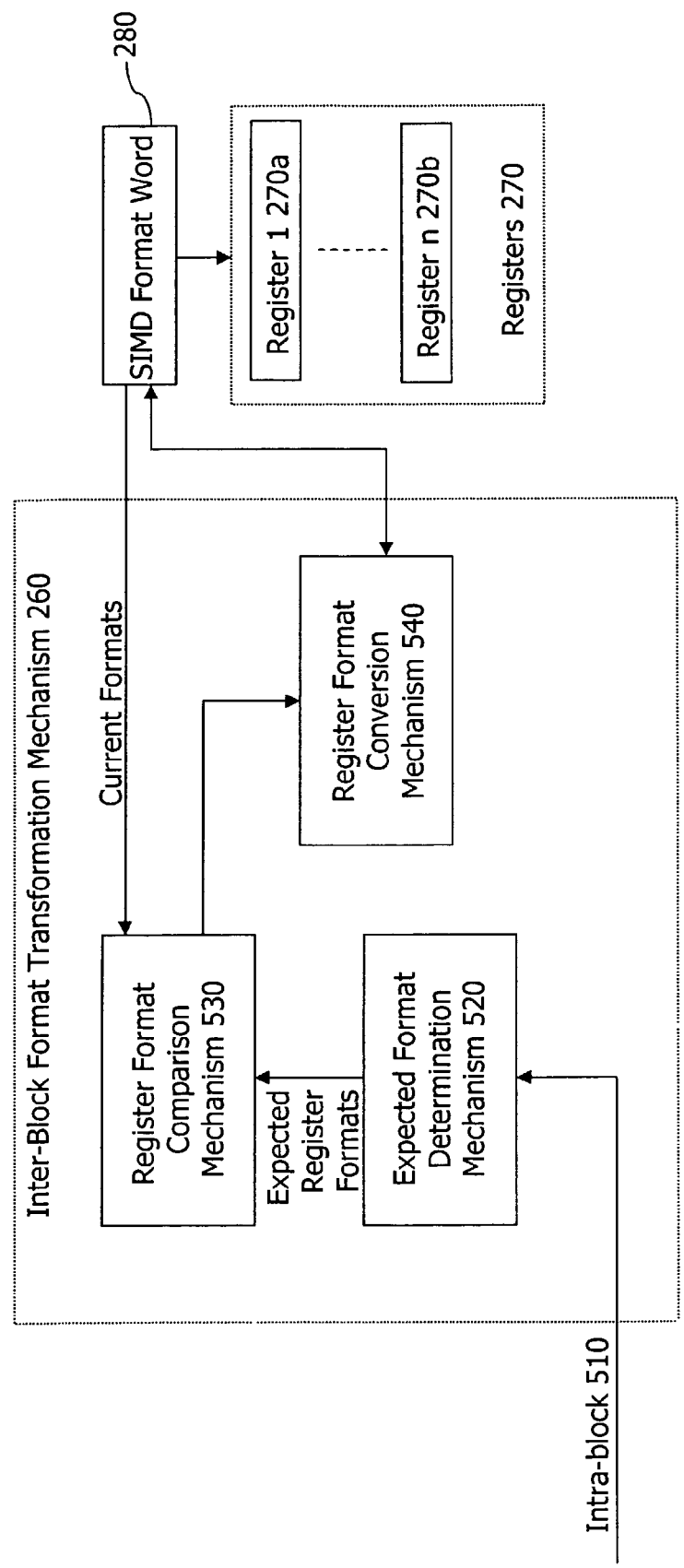
FIG. 5 depicts an exemplary internal structure of an inter-block format transformation mechanism.

FIG. 5 depicts an exemplary internal structure of the inter-block format transformation mechanism 260. As discussed earlier, the inter-block format transformation mechanism 260 is related to handling transitions between two adjacent intra-blocks of non-scalar SIMD instructions during execution time. In other words, it is related to inter-block processing. During executing the translated non-scalar SIMD instructions 240, the instruction execution mechanism 250 invokes the inter-block format transformation mechanism 260 when it enters a new intra-block to ensure that the formats of the registers 270 on the underlying target architecture are designated in accordance with what the new intra-block requires. To achieve that, the inter-block format transformation mechanism 260 comprises an expected format determination mechanism 520, a register format comparison mechanism 530, and a register format conversion mechanism 540.

The expected format determination mechanism 520 takes an intra-block 510 as input and determines the expected register format. The expected register formats are generated during the translation process and are identified based on all the instructions within the intra-block. Such expected formats are used to further determine whether the current designations of the registers 270 are consistent with what is expected. To do so, the register format comparison mechanism 530 compares the expected formats with the current formats, retrieved from the SIMD format word 280. If the current designated formats do not match with the expected formats, the register format comparison mechanism 530 activates the register format conversion mechanism 540 to convert the current formats according to the expected formats. The conversion may be achieved by changing the designation of the registers according to what is expected and record such changes in the SIMD format word 280.

Figure 6:
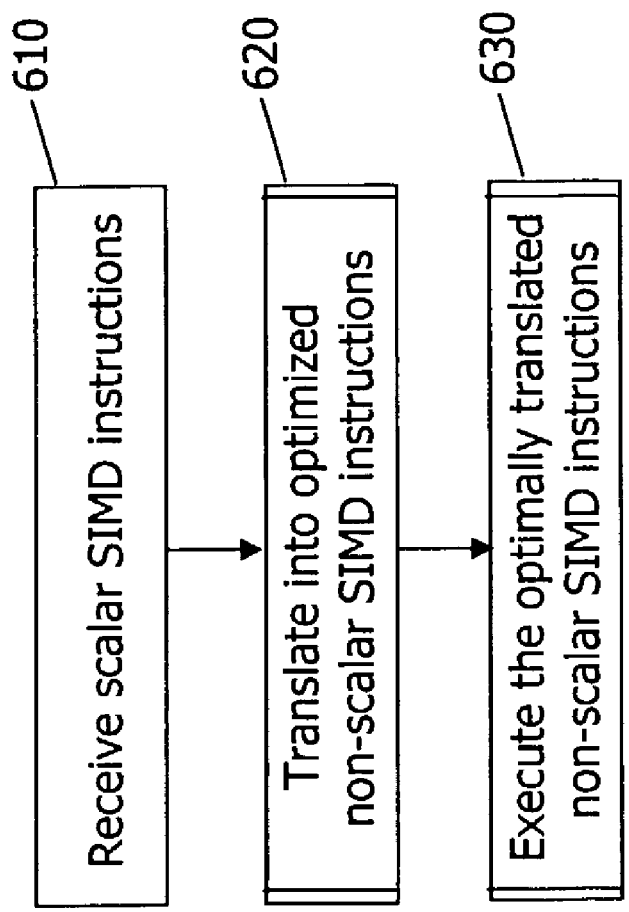
FIG. 6 is a flowchart of an exemplary process, in which a plurality of scalar SIMD instructions are translated into a plurality of optimized non-scalar SIMD instructions that are executed on an architecture supporting only parallel SIMD instructions.

FIG. 6 is a flowchart of an exemplary process, in which a plurality of scalar SIMD instructions (210) are translated into a plurality of optimized non-scalar SIMD instructions (240) that are executed on a target device with an architecture supporting only parallel SIMD instructions. A plurality of scalar SIMD instructions are received at act 610. The scalar SIMD instructions 210 are translated, at act 620, into the optimized non-scalar SIMD instructions 240. The details related to the translation is described below with reference to FIGS. 7, 8, and 9. Such translated non-scalar SIMD instructions are then executed, at act 630, on a target device that supports only parallel SIMD instructions. Details related to executing intra-blocks of non-scalar SIMD instructions are described below with reference to FIGS. 10 and 11.

Figure 7A:
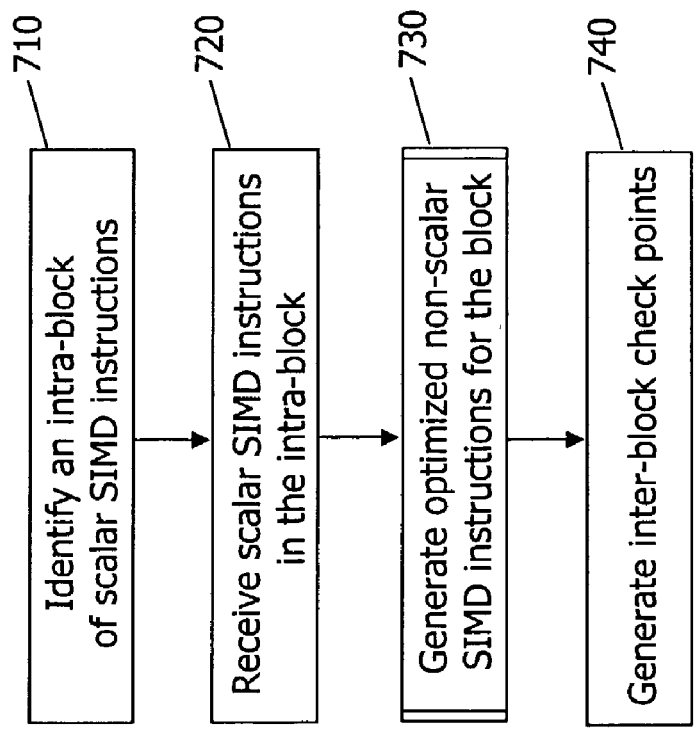
FIG. 7(a) is a flowchart of an exemplary process, in which a plurality of scalar SIMD instructions within an intra-block are translated into a plurality of optimized non-scalar SIMD instructions.

FIG. 7(a) is a flowchart of an exemplary process, in which translation is optimized wherein intra-blocks are identified and scalar SIMD instructions within each intra-block are translated into a plurality of optimized non-scalar SIMD instructions. An intra-block is identified first, at act 710, based on, for example, data dependencies among scalar SIMD instructions. After receiving, at act 720, scalar SIMD instructions contained in the intra-block, optimized non-scalar SIMD instructions are generated at act 730. Details about the specifics of the generation process are described with reference to FIGS. 8 and 9. For each intra-block of non-scalar SIMD instructions, inter-block check points are set up at act 740.

Figure 7B:
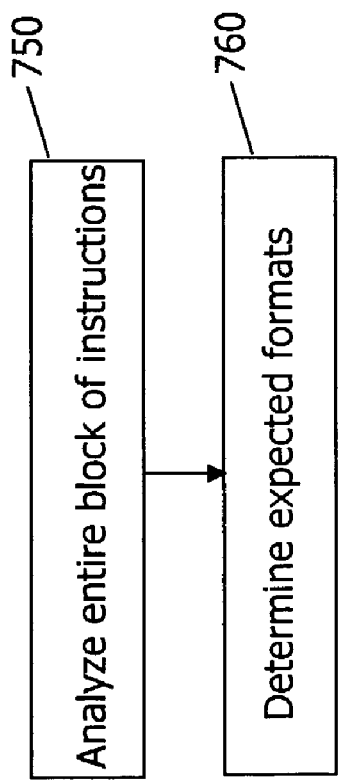
FIG. 7(b) is a flowchart of an exemplary process of setting up check point by generating expected register formats.

Generated check points may be used to identify the boundaries between adjacent intra-blocks and are used, during executing the non-scalar SIMD instructions of different intra-blocks, to ensure, prior to the execution of the blocks, that register formats on an underlying target device are designated consistent with expected formats of the registers required by each and every intra-block. FIG. 7(b) is a flowchart of an exemplary process to generate expected register formats within an intra-block of instructions. Instructions of the entire intra-block are analyzed at act 750. Based on such analysis, expected register formats are determined at act 760. Such determined expected register formats will be used, when the intra-block of instructions is executed, to convert registers on a target architecture to the desired formats.

Figure 8:
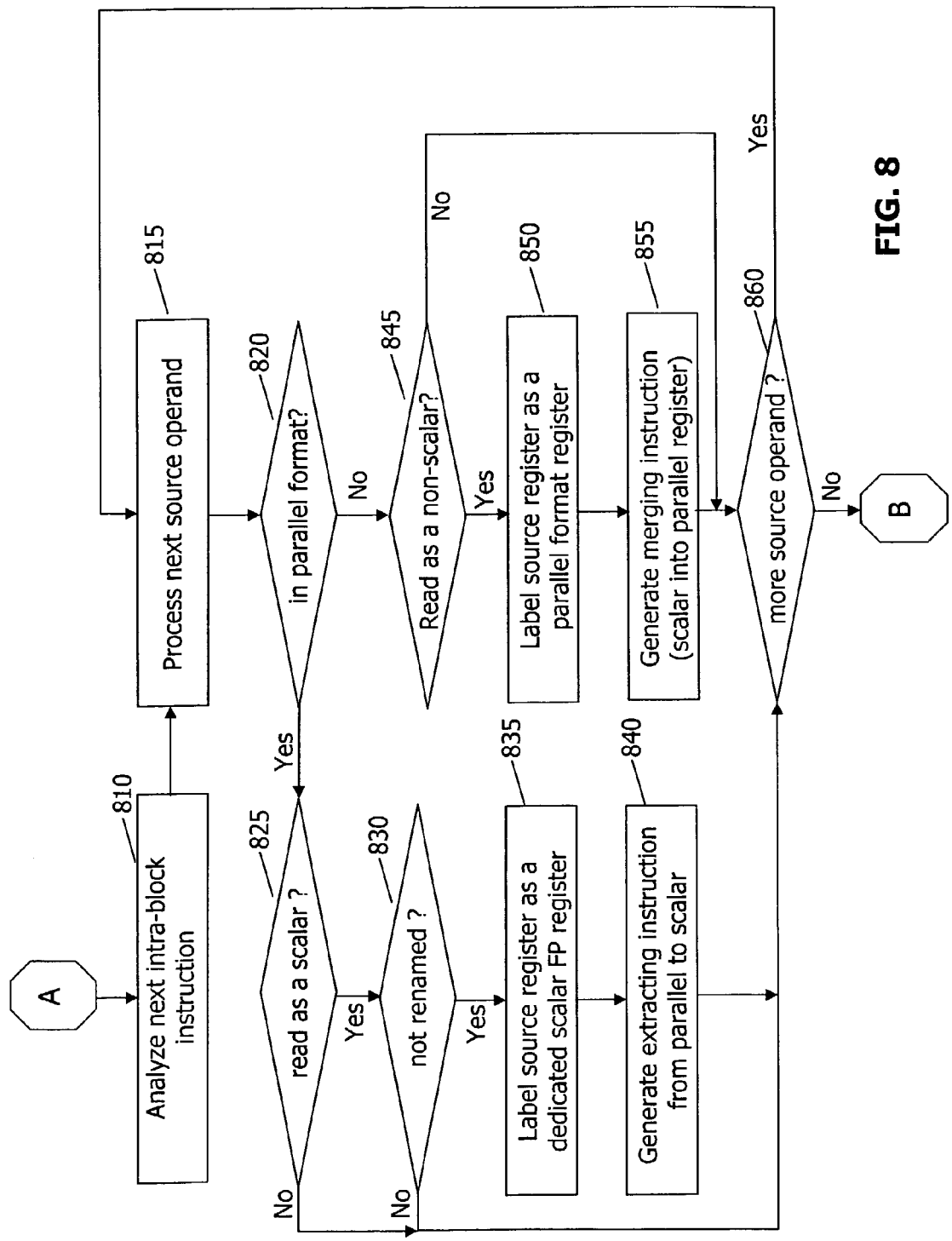
FIGS. 8-9 describe a flowchart of an exemplary process, in which non-scalar SIMD instructions are generated based on analysis on source operands and destination operands of scalar SIMD instructions in an intra-block.
Figure 9:
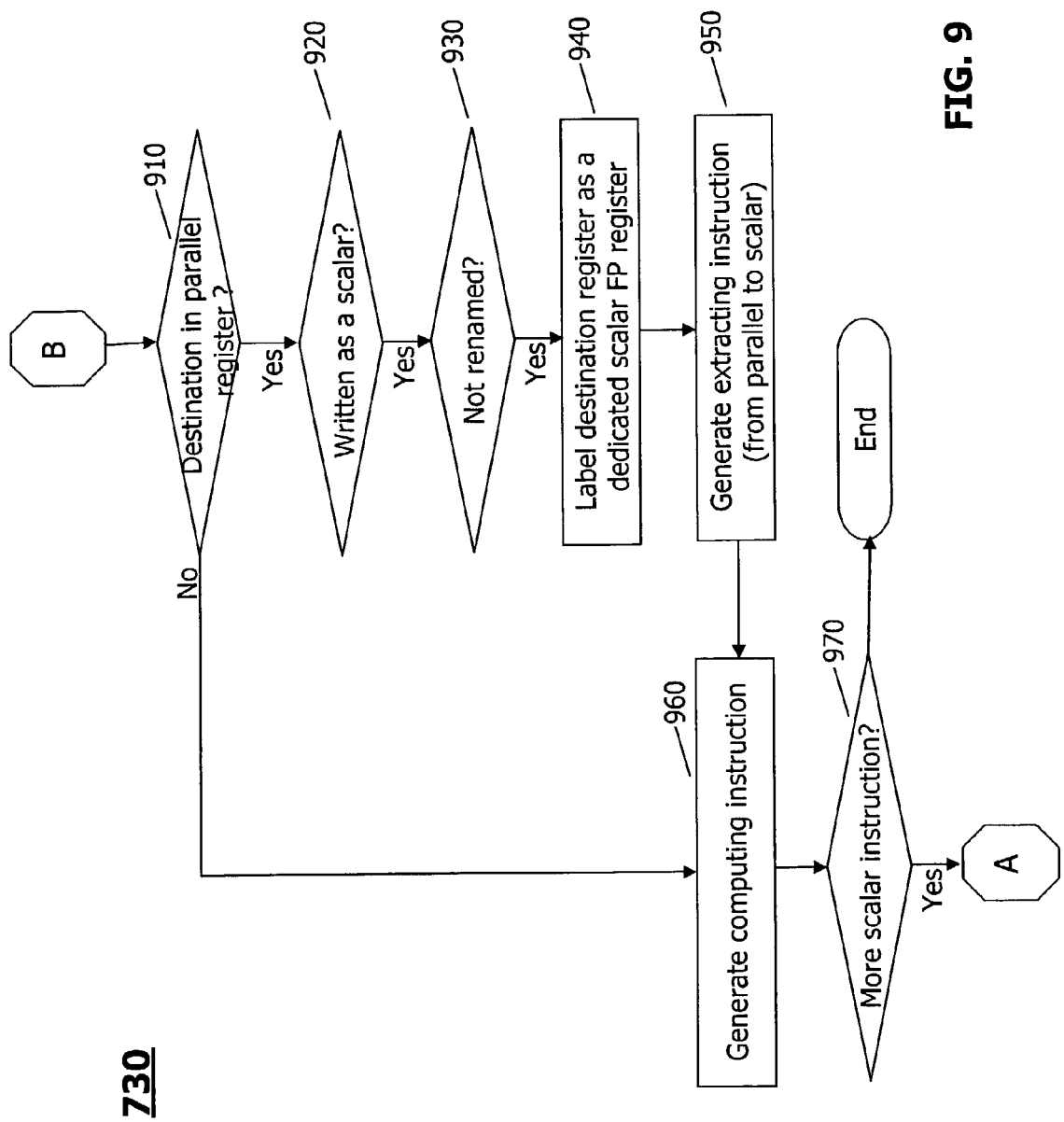

FIGS. 8-9 describe a flowchart of an exemplary process, in which non-scalar SIMD instructions are generated based on the characteristics of source operands and destination operands of the scalar SIMD instructions in an intra-block. Within each intra-block, each and every scalar SIMD instruction is processed individually. A scalar SIMD instruction is first analyzed at act 810. Such analysis may determine the computation involved in the instruction (e.g., whether it involves an "add" operation or a "multiply" operation) and the results of such analysis may be used to determine what corresponding non-scalar computation instruction may be ultimately generated.

Based on each scalar SIMD instruction, its source and destination operands may be processed, either in sequence or in parallel. A source operand may be first processed at act 810. If the source operand is in a parallel register but the source operand is used as a scalar and, in addition, the register to be used to hold the source operand for an underlying scalar operation is currently not designated as a scalar register, determined at acts 820, 825, and 830, then the register to be used for the scalar operation is labeled, at act 835, as a dedicated scalar floating point register. An extraction instruction is generated, at act 840, that extracts the source operand from the parallel register to the dedicated scalar floating point register.

If the source operand is in a scalar register but the source operand is read as a non-scalar, determined at acts 820 and 845, then the register to be used to read the source operand is labeled, at act 850, as a parallel register. A merging instruction is then generated, at act 855, that merges the scalar source operand into the parallel register. The process of source operand analysis continues until, determined at act 860, all the source operand(s) of the current scalar SIMD instruction in the input intra-block 510 is processed.

The processing of a destination operand is described in FIG. 9. If the destination operand is in a parallel register yet is intended written as a scalar in a destination register to be used to write the destination operand is currently not designated as a scalar register, determined at acts 910, 920, and 930, the destination register is labeled, at act 940, as a dedicated scalar floating point register and an extraction instruction is generated, at act 950, to extract the destination operand from the parallel register to the dedicated scalar floating point register. A non-scalar computing instruction corresponding to the underlying scalar instruction is further generated at act 960. For example, if an input scalar SIMD instruction involves an "add" operation, an instruction that carries out an "add" operation on the target device is accordingly generated.

If the destination operand is not in a parallel register, determined at act 910, the intra-block translation mechanism 320 simply generates, at act 960, an non-scalar SIMD computing instruction corresponding to the input scalar SIMD computing instruction. This processing of generating non-scalar SIMD instructions of an input intra-block based on the analysis of source and destination operands continues until, determined at act 970, all the scalar SIMD instructions in the intra-block 510 are translated.

Figure 10:
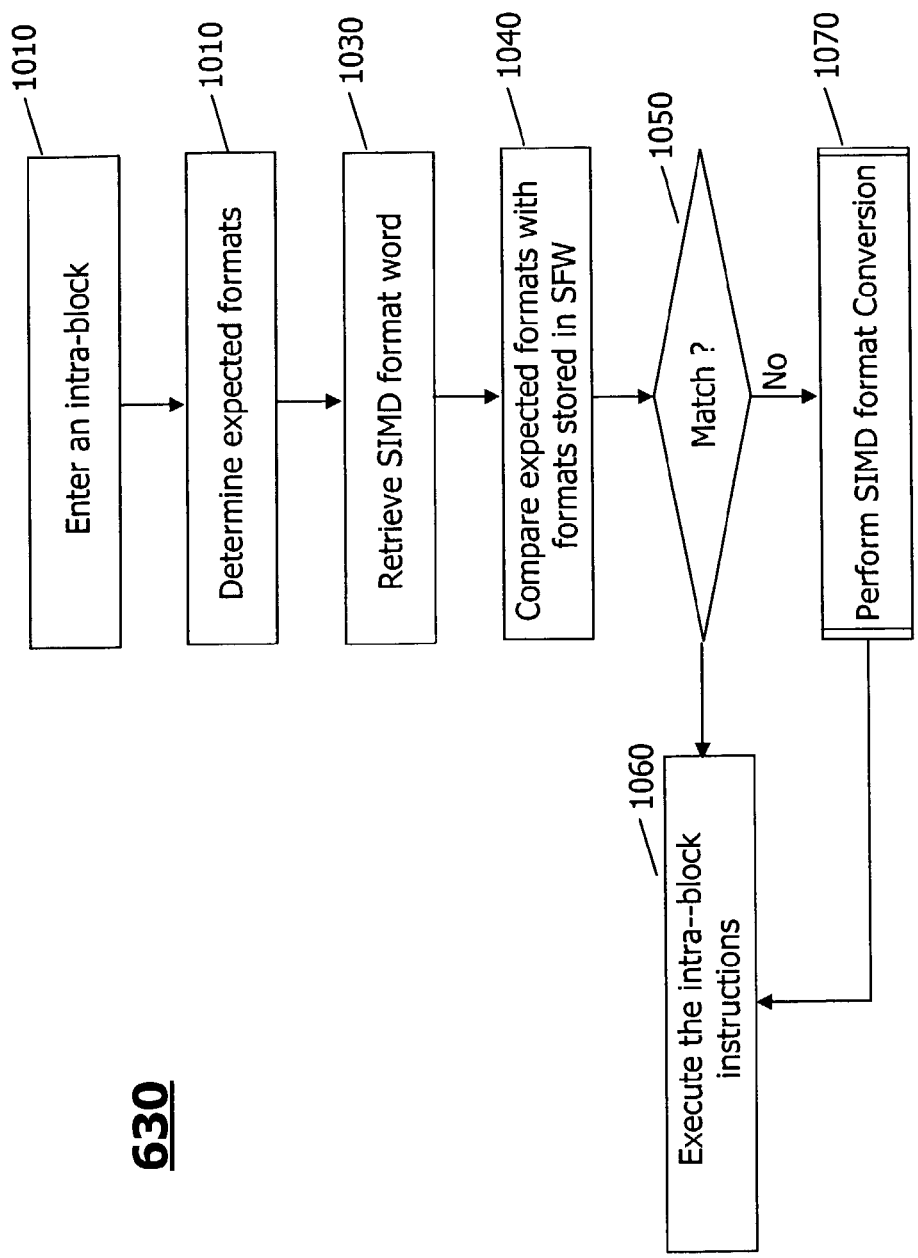
FIG. 10 is a flowchart of an exemplary process, in which, upon entering an intra-block of non-scalar SIMD instructions during execution, current formats of registers are compared with expected formats of the intra-block and converted in conform with the expected formats for efficient execution.

FIG. 10 is a flowchart of an exemplary process, in which translated non-scalar SIMD instructions 240 are executed on a target device with an architecture that supports only parallel SIMD instructions. Upon entering an intra-block of non-scalar SIMD instructions, at act 1010, expected formats of the registers are determined at act 1020. Since expected formats of each intra-block have been identified during translation when check points are generated (see FIGS. 7(*a*), 7(*b*)), the expected register formats may be simply determined, at 1020, from the check point information associated with the intra-block. To examine whether the current formats of the registers are consistent with the expected formats, the SIMD format word 280 is retrieved, at act 1030, and compared, at act 1040, with the expected formats. If the current formats specified in the SIMD format word match with the expected formats, determined at act 1050, the execution proceeds at act 1060. Otherwise, format conversion is performed, at act 1070, before the process continues to execute the next instruction at act 1060.

FIG. 11 is a flowchart of an exemplary process, in which register formats on an target architecture are converted to match expected register formats determined according to the non-scalar SIMD instructions contained in an intra-block. Expected formats and current formats of the registers (e.g., the SIMD format word) are first accessed at act 1110. Difference between the two is identified with respect to each register and conversion is carried out if there is a discrepancy between an expected format of a register and a current format of the same register.

Discrepancy in designated format with respect to a register is identified at act 1120. The expected format is recognized at act 1130 and the corresponding format recorded in the SIMD format word is changed, at act 1140, to conform with the expected format. This conversion process continues until, determined at act 1150, all the discrepancies are removed. The conversion process ends at act 1160 with the SIMD format word 280 reflects what is expected of the register formats.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method comprising:
    receiving, at a translator of a processing system, a plurality of scalar single instruction multiple data stream (SIMD) instructions;
    identifying an intra-block of M scalar SIMD instructions from the plurality of scalar SIMD instructions, wherein M>1; and
    translating the intra-block of M scalar SIMD instructions into N non-scalar SIMD instructions corresponding to the intra-block, wherein N<(M*4).

2. The method according to claim 1, further comprising executing the non-scalar SIMD instructions on target architecture supporting parallel SIMD instructions.

3. The method according to claim 2, wherein said executing the non-scalar SIMD instructions comprises:
    upon entering a new intra-block of non-scalar SIMD instructions generated from scalar SIMD instructions,
    determining expected formats of registers on the target architecture;
    retrieving a SIMD format word that records the current formats of the registers;
    comparing the expected formats with corresponding formats recorded in the SIMD format word to determine whether the expected formats match the current formats of the registers;
    performing format conversion so that the formats in the SIMD format word are consistent with the expected formats, if the expected formats do not match the current formats; and
    executing the non-scalar SIMD instructions in the new intra-block.

4. The method according to claim 3, wherein said performing format conversion comprises:
    for each non-matching pair of an expected format and a current format corresponding to one of the registers on the target architecture,
    identifying the expected register format based on the intra-block of the non-scalar SIMD instructions;
    converting the current format of the register recorded in the SIMD format word to the expected format.

5. The method according to claim 1, further comprising:
    a source operand of a scalar SIMD instruction in the intra-block is in a parallel format and is read as a scalar and a corresponding source register is currently not labeled as a dedicated scalar floating point register,
    labeling the source register as a dedicated scalar floating point register, and
    generating an extraction instruction that extracts the source operand in a parallel format to the dedicated scalar floating point register.

6. The method according to claim 1, further comprising:
    if a source operand of a scalar SIMD instruction in the intra-block is in a non-parallel format and is read as a non-scalar,
    labeling a source register corresponding to the source operand as a parallel format register, and
    generating a merging instruction that merges a scalar into the parallel format register.

7. The method according to claim 1, further comprising:
    if a destination operand of a scalar SIMD instruction in the intra-block is in a parallel register, the destination operand is written as a scalar, and its corresponding destination register is currently not labeled as a dedicated scalar floating point register:
    labeling the destination register as a dedicated scalar floating point register,
    generating an extracting instruction to extract the destination operand from the parallel register to the dedicated scalar floating point register, and
    generating a computing instruction according to the computation to be performed by the scalar SIMD instruction; and
    if the destination operand is not in a parallel register, generating a computing instruction according to the computation to be performed by the scalar SIMD instruction.

8. The method according to claim 1, wherein translating the intra-block of M scalar SIMD instructions into N non-scalar SIMD instructions comprises:
    processing a source operand of each scalar SIMD instruction in the intra-block; and
    processing a destination operand of each scalar SIMD instruction in the intra-block.

9. The method according to claim 8, wherein said processing a source operand comprises:
if the source operand is in a parallel format and is read as a scalar and a corresponding source register is currently not labeled as a dedicated scalar floating point register,
labeling the source register as a dedicated scalar floating point register, and
generating an extraction instruction that extracts the source operand in a parallel format to the dedicated scalar floating point register.

10. The method according to claim 9, further comprising:
if the source operand is in a non-parallel format and is read as a non-scalar,
labeling a source register corresponding to the source operand as a parallel format register, and
generating a merging instruction that merges a scalar into the parallel format register.

11. The method according to claim 8, wherein processing each destination operand of the scalar SIMD instruction comprises:
if the destination operand is in a parallel register, the destination operand is written as a scalar and its corresponding destination register is currently not labeled as a dedicated scalar floating point register,
labeling the destination register as a dedicated scalar floating point register,
generating an extracting instruction the extracts the destination operand from the parallel register to the dedicated scalar floating point register, and
generating a computing instruction according to the computation to be performed by the scalar SIMD instruction; and
if the destination operand is not in a parallel register, generating a computing instruction according to the computation to be performed by the scalar SIMD instruction.

12. A system, comprising:
a dynamic binary translator capable of:
receiving a plurality of scalar single instruction multiple data stream (SIMD) instructions designed for a source architecture;
identifying an intra-block of M scalar SIMD instructions from the plurality of scalar SIMD instructions, wherein M>1: and
translating the intra-block of M scalar SIMD instructions into N non-scalar SIMD instructions for a target architecture, wherein N<(M*4); and
an instruction execution mechanism capable of executing the N non-scalar SIMD instructions.

13. The system according to claim 12, wherein the dynamic binary translator comprises:
a source operand processing mechanism capable of analyzing one or more source operands in each scalar SIMD instruction in the intra-block to determine whether one or more registers on the target architecture should be labeled and what non-scalar SIMO instruction should be generated;
a destination operand processing mechanism capable of analyzing a destination operand in each scalar SIMD instruction in the intra-block to determine whether a destination register on the target architecture should be labeled and what non-scalar SIMD instruction should be generated; and
a non-scalar SIMD instruction generation mechanism capable of generating a non-scalar SIMD instruction according to the processing results from the source operand processing mechanism and the destination operand processing mechanism.

14. The system according to claim 13, further comprising:
an instruction analysis mechanism capable of analyzing each scalar SIMD instruction in the intra-block;
a register labeling mechanism capable of labeling a register on the target architecture as either a parallel register or a dedicated scalar floating point register according to the processing results from the source operand processing mechanism and the destination operand processing mechanism; and
a check-point establishment mechanism capable of setting up one or more check points for the intra-block and generating expected register formats of the intra-block.

15. The system according to claim 12, wherein the instruction execution mechanism includes an inter-block format transformation mechanism capable of converting registers on the target architecture in conformity with expected formats of the registers determined based on the intra-block.

16. The system according to claim 15, wherein the inter-block format transformation mechanism includes:
an expected format determination mechanism capable of determining, upon entering the intra-block, the expected formats of registers on the target architecture;
a register format comparison mechanism capable of comparing the expected formats with current formats recorded in an SIMD format word; and
a register format conversion mechanism capable of converting, if the current formats do not match with the expected formats, the current formats in the SIMD format word to the expected formats.

17. An article comprising a storage medium having stored thereon instructions that, when executed by a machine, result in the following:
receiving a plurality of scalar single instruction multiple data stream (SIMD) instructions;
identifying an intra-block of M scalar SIMD instructions from the plurality of scalar SIMD instructions, wherein M>1; and
translating the intra-block of M scalar SIMD instructions into N non-scalar SIMD instructions with respect to a target architecture supporting parallel SIMD instructions, wherein N<(M*4).

18. The article according to claim 17, wherein the instructions, when executed by the machine, cause the machine to execute the non-scalar SIMD instructions.

19. The article according to claim 18, wherein executing the non-scalar SIMD instructions comprises:
upon entering a new intra-block of non-scalar SIMD instructions generated from scalar SIMD instructions, determining expected formats of registers on the target architecture;
retrieving a SIMD format word that records the current formats of the registers;
comparing the expected formats with corresponding formats recorded in the SIMD format word to see whether the expected formats match with the current formats of the registers;
performing format conversion so that the formats in the SIMD format word are consistent with the expected formats, if the expected formats do not match the current formats; and
executing the non-scalar SIMD instructions in the new intra-block.

20. The article according to claim 19, wherein said performing format conversion comprises:

for each non-matching pair of an expected format and a current format corresponding to one of the registers on the target architecture,
identifying the expected format of the register determined based on the intra-block of the non-scalar SIMD instructions;
converting the current format of the register recorded in the SIMD format word to the expected format.

21. The article according to claim 17, wherein said instructions, when executed by the machine, cause the machine to perform operations comprising:
if a source operand of a scalar SIMD instructions in the intra-block is in a parallel format and is read as a scalar and a corresponding source register is currently not labeled as a dedicated scalar floating point register,
labeling the source register as a dedicated scalar floating point register, and
generating an extraction instruction that extracts the source operand in a parallel format to the dedicated scalar floating point register.

22. The article according to claim 17, wherein said instructions, when executed by the machine, cause the machine to perform operations comprising:
if a source operand of a scalar SIMD instructions in the intra-block is in a non-parallel format and is read as a non-scalar,
labeling a source register corresponding to the source operand as a parallel format register, and
generating a merging instruction that merges a scalar into the parallel format register.

23. The article according to claim 17, wherein said instructions, when executed by the machine, cause the machine to perform operations comprising:
if a destination operand of a scalar SIMD instructions in the intra-block is in a parallel register, the destination operand is written as a scalar, and its corresponding destination register is currently not labeled as a dedicated scalar floating point register:
labeling the destination register as a dedicated scalar floating point register,
generating an extracting instruction the extracts the destination operand from the parallel register to the dedicated scalar floating point register, and
generating a computing instruction according to the computation to be performed by the scalar SIMD instruction; and if destination operand is not in a parallel register, generating a computing instruction according to the computation to be performed by the scalar SIMD instruction.

24. A system comprising:
a translator to receive a plurality of scalar single instruction multiple data stream (SIMD) instructions, and to identify an intra-block of M scalar SIMD instructions from the plurality of scalar SIMD instructions, wherein M<1; and
an intra-block instruction translation mechanism in the translator, to generate N non-scalar SIMD instructions based on the M scalar SIMD instructions in the intra-block to produce a set of non-scalar SIMD instructions corresponding to the intra-block, wherein N<(M*4).

25. The system according to claim 24, wherein the intra-block instruction translation mechanism comprises:
a source operand processing mechanism capable of analyzing a source operand in each scalar SIMD instruction in the intra-block to determine whether a register on a target architecture should be labeled;
a destination operand processing mechanism capable of analyzing a destination operand in each scalar SIMD instruction in the intra-block to determine whether a destination register on the target architecture should be labeled; and
an instruction generation mechanism capable of generating a non-scalar SIMD instruction according to the determinations of the source operand processing mechanism and the destination operand processing mechanism.

26. The system according to claim 25, further comprising:
an instruction analysis mechanism capable of analyzing each scalar SIMD instruction in the intra-block; and
a register labeling mechanism capable of labeling a register on the target architecture as either a parallel register or a dedicated scalar floating point register according to the processing results from the source operand processing mechanism and the destination operand processing mechanism.

* * * * *